United States Patent
Hajewski et al.

(10) Patent No.: US 12,045,164 B2
(45) Date of Patent: Jul. 23, 2024

(54) CONCURRENT COMPUTATION ON DATA STREAMS USING COMPUTATIONAL GRAPHS

(71) Applicant: Salesforce, Inc., San Francisco, CA (US)

(72) Inventors: Jeffrey Hajewski, San Francisco, CA (US); Stefan Derdak, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/206,633

(22) Filed: Mar. 19, 2021

(65) Prior Publication Data

US 2022/0300416 A1    Sep. 22, 2022

(51) Int. Cl.
  *G06F 12/02*   (2006.01)
  *G06F 16/901*  (2019.01)

(52) U.S. Cl.
  CPC ...... *G06F 12/0269* (2013.01); *G06F 16/9024* (2019.01)

(58) Field of Classification Search
  None
  See application file for complete search history.

(56) References Cited

U.S. PATENT DOCUMENTS

| | | | |
|---|---|---|---|
| 9,185,342 B2 | 11/2015 | Isaacs | |
| 9,444,857 B2 | 9/2016 | Isaacs | |
| 9,626,523 B2 | 4/2017 | Isaacs | |
| 9,992,242 B2 | 6/2018 | Isaacs | |
| 10,089,638 B2 | 10/2018 | Rohde | |
| 10,296,717 B2 | 5/2019 | Isaacs | |
| 10,313,476 B2 | 6/2019 | Isaacs | |
| 10,516,729 B2 | 12/2019 | Crawford | |
| 10,715,459 B2 | 7/2020 | Isaacs | |
| 10,755,218 B2 | 8/2020 | Dudyala | |
| 10,795,743 B2 | 10/2020 | Sur | |
| 10,853,154 B2 | 12/2020 | Derdak et al. | |
| 2006/0294499 A1* | 12/2006 | Shim | G06F 8/10 717/107 |
| 2008/0082644 A1* | 4/2008 | Isard | H04L 67/1097 709/223 |

(Continued)

FOREIGN PATENT DOCUMENTS

CA    3021361 A1    1/2019

OTHER PUBLICATIONS

"queue". FOLDOC: Free On-Line Dictionary of Computing. Published on May 18, 2007. Accessed Mar. 14, 2022 from http://foldoc.org/queue (Year: 2007).*

(Continued)

*Primary Examiner* — Alex Gofman
*Assistant Examiner* — Umar Mian
(74) *Attorney, Agent, or Firm* — Kwan & Olynick LLP

(57) ABSTRACT

Disclosed are some implementations of systems, apparatus, methods and computer program products for generating and implementing computational graphs that facilitate concurrent computation on data streams. A computational graph includes a plurality of nodes, where each node has one or more stages associated therewith. Each stage may be associated with a corresponding operation that is to be performed on data associated with that stage.

16 Claims, 16 Drawing Sheets

(56) References Cited

U.S. PATENT DOCUMENTS

| | | | |
|---|---|---|---|
| 2008/0098375 A1* | 4/2008 | Isard | G06F 11/1438 |
| | | | 717/149 |
| 2010/0088668 A1 | 4/2010 | Yoshihama | |
| 2014/0137129 A1* | 5/2014 | Jacob | G06F 8/314 |
| | | | 718/103 |
| 2014/0172810 A1* | 6/2014 | Paradies | G06F 16/951 |
| | | | 707/705 |
| 2015/0178406 A1 | 6/2015 | Hong | |
| 2016/0110228 A1 | 4/2016 | Zhang | |
| 2016/0234070 A1 | 8/2016 | Calo | |
| 2018/0053328 A1 | 2/2018 | Simonovic | |
| 2018/0365713 A1 | 12/2018 | Rohde | |
| 2019/0155850 A1 | 5/2019 | Shi | |
| 2019/0361896 A1 | 11/2019 | Brunets | |
| 2020/0272658 A1 | 8/2020 | Suyash | |
| 2020/0344176 A1 | 10/2020 | Isaacs | |
| 2021/0150568 A1 | 5/2021 | Farhadi | |
| 2021/0157858 A1* | 5/2021 | Stevens | G06F 16/90335 |
| 2021/0295181 A1* | 9/2021 | Goyal | G06N 20/00 |
| 2021/0385251 A1* | 12/2021 | Crabtree | G06F 16/951 |
| 2021/0406288 A1 | 12/2021 | Wright | |
| 2022/0179859 A1 | 6/2022 | Faltin | |
| 2022/0335340 A1 | 10/2022 | Moustafa | |

OTHER PUBLICATIONS

"server". FOLDOC: Free On-Line Dictionary of Computing. Published on Dec. 29, 2003. Accessed Mar. 14, 2022 from http://foldoc.org/server (Year: 2003).*

Weisstein, Eric W. "Graph Edge." From MathWorld—A Wolfram Web Resource. Accessed Mar. 14, 2022 from https://mathworld.wolfram.com/GraphEdge.html (Year: 2022).*

Weisstein, Eric W. "Graph Vertex." From MathWorld—A Wolfram Web Resource. Accessed Mar. 16, 2022 from https://mathworld.wolfram.com/GraphVertex.html (Year: 2022).*

Payload. (n.d.) Computer Desktop Encyclopedia. (1981-2019). Accessed Mar. 16, 2022 from https://www.computerlanguage.com/results.php?definition=payload (Year: 2022).*

Office Action (Final Rejection) dated Jan. 3, 2023 for U.S. Appl. No. 17/206,667 (pp. 1-36).

Office Action dated Jul. 27, 2022 for U.S. Appl. No. 17/206,667 (pp. 1-38).

Office Action dated Feb. 3, 2022 for U.S. Appl. No. 17/206,667 (pp. 1-27).

Office Action (Non-Final Rejection) dated Sep. 13, 2023 for U.S. Appl. No. 17/206,667 (pp. 1-36).

Office Action (Final Rejection) dated Feb. 5, 2024 for U.S. Appl. No. 17/206,667 (pp. 1-42).

* cited by examiner

CONCURRENT COMPUTATION ON DATA STREAMS USING COMPUTATIONAL GRAPHS

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

FIELD OF TECHNOLOGY

This patent document relates generally to systems and techniques associated with performing computations on data streams, and more specifically to performing computations on data streams using computational graphs.

BACKGROUND

In computing systems, a mathematical expression is often expressed by a computational graph. Typically a computational graph is a directed graph that includes a number of nodes that are connected by directed edges. Generally, each node in the directed graph represents an input value or a mathematical operation. The expression may then be evaluated by traversing the computational graph.

One scenario in which a computational graph is useful is the analysis of data in a data stream. As data is received, the data is processed using the computational graph.

BRIEF DESCRIPTION OF THE DRAWINGS

The included drawings are for illustrative purposes and serve only to provide examples of possible structures and operations for the disclosed inventive systems, apparatus, methods and computer program products for facilitating the processing of a data stream using a computational graph. These drawings in no way limit any changes in form and detail that may be made by one skilled in the art without departing from the spirit and scope of the disclosed implementations.

DETAILED DESCRIPTION

Figure 1A:
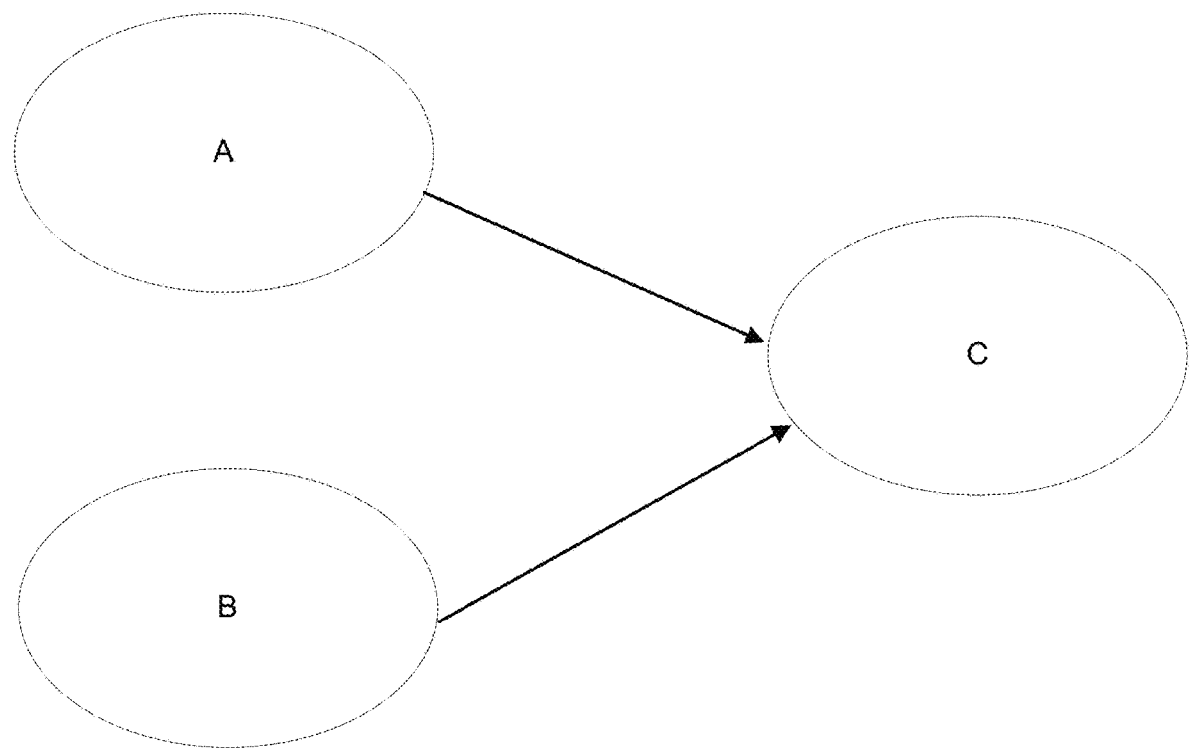
FIG. 1A shows a diagram of a directed graph representing a computation.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from the spirit and scope of the disclosure.

The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more examples may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

Some implementations of the disclosed systems, apparatus, methods and computer program products are configured to facilitate the generation of a computational graph that can be applied to process data of a data stream. In some implementations, a server system is configured to process data of a data stream according to a computational graph.

A computational graph often includes a directed graph that includes nodes (or vertices) that are connected by directed edges. Each node may represent an input value or an operation to be performed on data received by the node. Nodes within the graph may be connected to one another based upon their dependencies. A computational graph can be particularly useful in a distributed environment, where each node in the computational graph represents a server in the distributed environment.

Through the use of a computational graph, a data stream may be "split" and "rejoined" as different operations/computations are performed on data within the data stream. These disparate streams may each be represented by a corresponding node or path of nodes in the computational graph.

In a streaming setting, graphical computation can be quite challenging when there are computational dependencies. A computational dependency exists where one computation (e.g., represented by a node in a computational graph) depends on the result of computation (e.g., represented by another node in the computational graph). The challenge stems from two notorious problems in distributed systems: the network is unreliable and servers corresponding to nodes of a computational graph may fail. In the streaming data setting, a node that depends on more than one node typically buffers (e.g., store locally) received data until it receives all pieces of data required for the corresponding computation. This introduces two problems: garbage collection and memory exhaustion.

Buffering data locally until all pieces of data required for a computation have been received takes up memory or disk space (or both). Memory usage generally increases linearly with the number of data messages received. The growth in allocated memory can quickly lead to memory exhaustion, which can cause a server to fail.

In the event of a server failure, data may not arrive on one of the streams. As a result, this stream may wait indefinitely for the data.

Current systems address the potential non-arrival of data by storing data that is received in memory for a pre-defined "window" of time rather than storing the data indefinitely until the rest of the data required for the computation arrives. However, this solution involves using an ever-increasing amount of memory. By "windowing" the data for a pre-defined period of time, data that is received after the window of time has expired may be discarded. By discarding data that is outside the range of "acceptably late" data, it is possible to limit the amount of memory consumed. Unfortunately, this technique has substantial limitations.

The selection of a pre-defined window of time that is neither too large nor too small is a complex one. Selecting a window of time that is too small may result in discarding data that is not lost, while selecting a window of time that is too large may result in substantial memory consumption.

Furthermore, the garbage collection process that is performed to remove data that is discarded can be time consuming and inefficient. During a conventional garbage collection process, timestamps are used to remove data that should not be considered. In some instances, garbage collection may block new data from entering into a node while buffered data is being reviewed. While non-blocking garbage collection techniques may be implemented, this can result in a complex implementation.

In accordance with various implementations, a computational graph is generated, where each node in the computational graph relies on only a single piece of data for a given computation, enabling concurrent computations to be performed. Since each node relies on a single piece of data, a constant amount of memory may be allocated per computation and windowing need not be implemented.

In some implementations, a computational graph is generated by applying topological sorting to an initial computational graph. The initial computational graph may identify a plurality of nodes and indicate an order of traversal of directed edges among the first plurality of nodes. One or more of the first plurality of nodes may each correspond to an operation to be performed on data received by the node via one or more directed edges connected to the node within the initial computational graph. The computational graph that is generated may represent a second plurality of nodes, where at least one node in the second plurality of nodes is associated with one or more stages. Each stage may be associated with a corresponding operation to be performed on data associated with that stage. In addition, the computational graph may indicate, for at least one node in the second plurality of nodes, for at least one of the corresponding stages, a next stage.

In some implementations, a data message that is transmitted to a node is modified by adding contextual information to the message. The contextual information may indicate, for example, a stage in the computational graph for which a corresponding operation is to be performed on the data. In addition, the contextual information may include an identifier of the computational graph.

In some implementations, each piece of data is "wrapped" in a data object that encodes the data's location (or computational stage) in the graph. In addition, an identifier of the computational graph may be encoded in the data object. Since stage information and optionally an identifier of the computational graph may be encoded with data, the data object may be processed by any computing device to generate results for that computational stage.

In some implementations, a computing device obtains a single piece of data and a corresponding stage identifier that identifies a current stage in a computational graph. In addition, an identifier of the pertinent computational graph may be provided to the computing device. For example, the computing device may obtain a data object that includes data and encodes the data's computational stage and, optionally, includes an identifier of the pertinent computational graph. The computational graph may include a plurality of nodes, where at least one of the nodes is associated with a corresponding set of one or more stages, where at least one stage is associated with a corresponding operation to be performed on data associated with that stage. In addition, the computational graph indicates, for at least a subset of the nodes, for at least one of the corresponding stages, a next stage. Using the computational graph, the computing device may identify the operation associated with the computational stage. The computing device may then apply the operation to the data and provide results of the operation for access by a subsequent computational stage in the computational graph.

In some implementations, a computing device obtains a first data object that includes data and that encodes the data's location (or computational stage) in a computational graph. The computing device uses the computational stage to look up the operation that should be performed in the computational graph and performs the operation on the data. The computing device may then encode results of the operation in a second data object with the next location or computational stage in the computational graph. The computing device may communicate with a queueing service to obtain the first data object, as well as store the second data object.

To illustrate the advantages of the disclosed implementations, an example will be instructive. An example implementation will be described in further detail below with reference to FIGS. 1A-1D.

FIG. 1A shows a diagram of a directed graph representing a computation A+B=C. More particularly, nodes A and B provide input to node C while node C represents the operation "+". Nodes A and B may each correspond to a respective computation. As shown in this example, A and B must complete the respective computation prior to C executing its computation.

One of the challenges in processing a data stream using a directed graph such as that shown in FIG. 1A is that node C will receive results from nodes A and B at different points in time. When this occurs, node C typically sets aside the received data and waits for the other data. If node C were to wait arbitrarily long, it would eventually run out of memory or stall the computation.

One solution to this problem is referred to as "windowing." In this example, node C waits for a predetermined window of time. Once that window of time expires, the received data is discarded. Unfortunately, the success of such an algorithm lies, in large part, on the selection of an optimal window of time. In many instances, the window of time is not optimal, resulting in the discarding of data that should not be discarded.

In accordance with various implementations, a computational graph is applied to a data stream, where each node of the computational graph relies on a single piece of data. Since each node relies on a single piece of data, a node need not set aside data for processing. As a result, a computation may be performed without windowing and without requiring an arbitrary amount of memory.

Figure 1B:
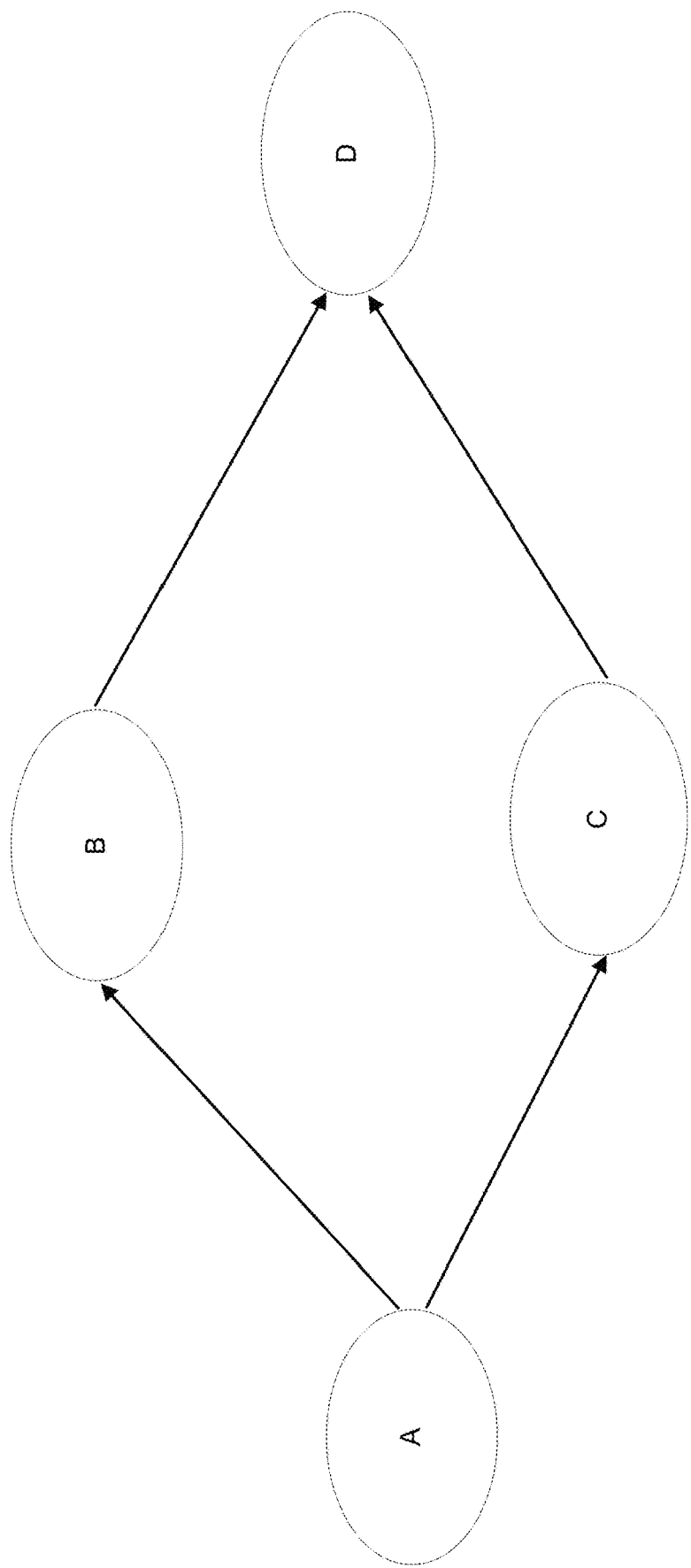
FIG. 1B shows a diagram of another directed graph representing a more complex computation.

A computational graph may be generated by reorganizing a traditional directed graph such as that shown in FIG. 1A. To illustrate the process of generating a computational graph, a computational graph representing a more complex computation is shown in FIG. 1B. In this example, node A transmits its data to two different nodes, node B and node C. Nodes B and C each perform a corresponding computation on the data and send results of the computation to node D. Node D may then perform its computation on the results received from nodes B and C.

As shown in this example, computations performed by nodes B and C may be performed concurrently (e.g., in parallel). The windowing approach is advantageous since it accommodates concurrent computations while reducing per message latency. However, windowing may be sub-optimal in a number of situations.

In accordance with various implementations, a computational graph may be generated by "reorganizing" an initial traditional computational graph so that each computation relies on only one piece of data. The reorganization process results in two or more possible sequential paths that preserve original dependencies within the initial computational graph. Reorganizing the initial computational graph so that computations are performed sequentially eliminates concurrent computations for which independent results are generated and applied in a single subsequent computation.

Figure 1C:
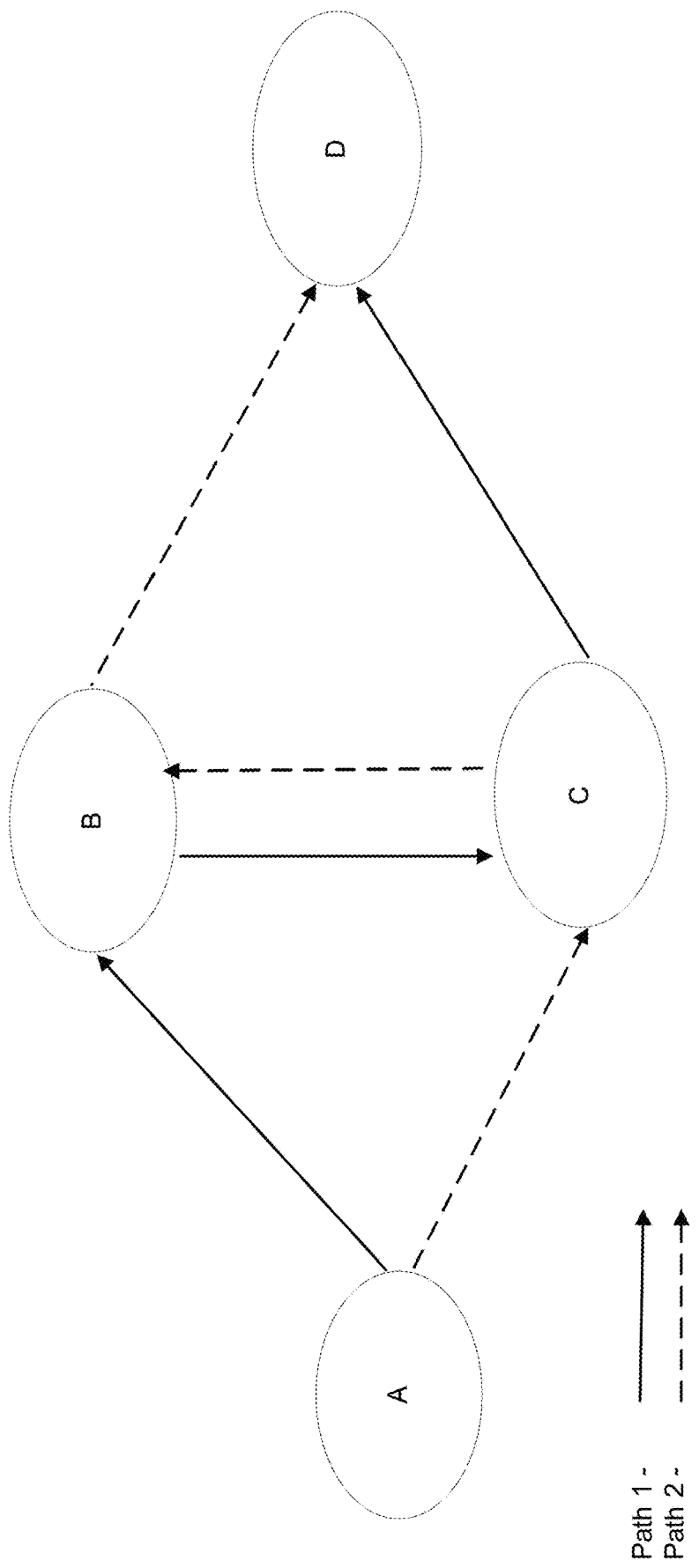
FIG. 1C shows a diagram of a computational graph that may be generated, in accordance with some implementations.

The graph of FIG. 1B may be "reorganized" such that a computational graph is generated. FIG. 1C shows a diagram of a computational graph that may be generated, in accordance with some implementations. As shown in this example, the computational graph represents two different sequential paths that were possible in the graph of FIG. 1B. Each path comprises a serialized sequence of computations, each of which may be associated with a corresponding node of FIG. 1B. Therefore, the dependencies of the graph of FIG. 1B are preserved in the reorganized graph of FIG. 1C.

As shown in this example, each of the paths may traverse all of the nodes of the initial computational graph. In other words, each of the possible paths may traverse the same nodes. However, the order in which the nodes are traversed in each of the possible paths will differ.

In accordance with various implementations, since a node may be associated with more than one path, each possible path for that node is uniquely identified. In some implementations, each such location within the graph that is associated with a node and a corresponding path may be identified by a stage identifier. A stage identifier may include a single stage identifier. Alternatively, a stage identifier may identify a node and/or corresponding path. Thus, each node may be associated with one or more stages.

In this example, node A is associated with two different stages. For example, stage identifiers for node A may include "Path 1, node A" and "Path 2, node A." As another example, stage identifiers for node A may include a unique identifier such as "Stage 1" and "Stage 2," where Stage 1 corresponds to Path 1 of node A and Stage 2 corresponds to Path 2 of node A. Each stage may be associated with a corresponding computation or operation to be performed on data associated with that stage.

As shown in this example, latency of individual messages is sacrificed. If only one path of the graph of FIG. 1C were serialized, this would be detrimental to the throughput of the system. However, by processing data via all paths of a reorganized graph, it is possible to maintain overall throughput of the system. For example, node A may send first data via Path 1 to node B, then send subsequently received second data via Path 2 to node C. As shown in this example, the data that is processed along either path will have gone through same vertices. By interleaving data along the different paths of the graph enables throughput to be maintained. At each stage, a corresponding computation or operation on the data received by that node may be performed. Therefore, a sequence of data items in a data stream may be processed in an efficient manner using a computational graph such as that shown in FIG. 1C.

Importantly, data need not be buffered and garbage collection need not be performed. Each piece of data either proceeds to the next node or is dropped. If a computation fails or a message is lost, the system continues to operate and throughput is maintained.

Figure 1D:
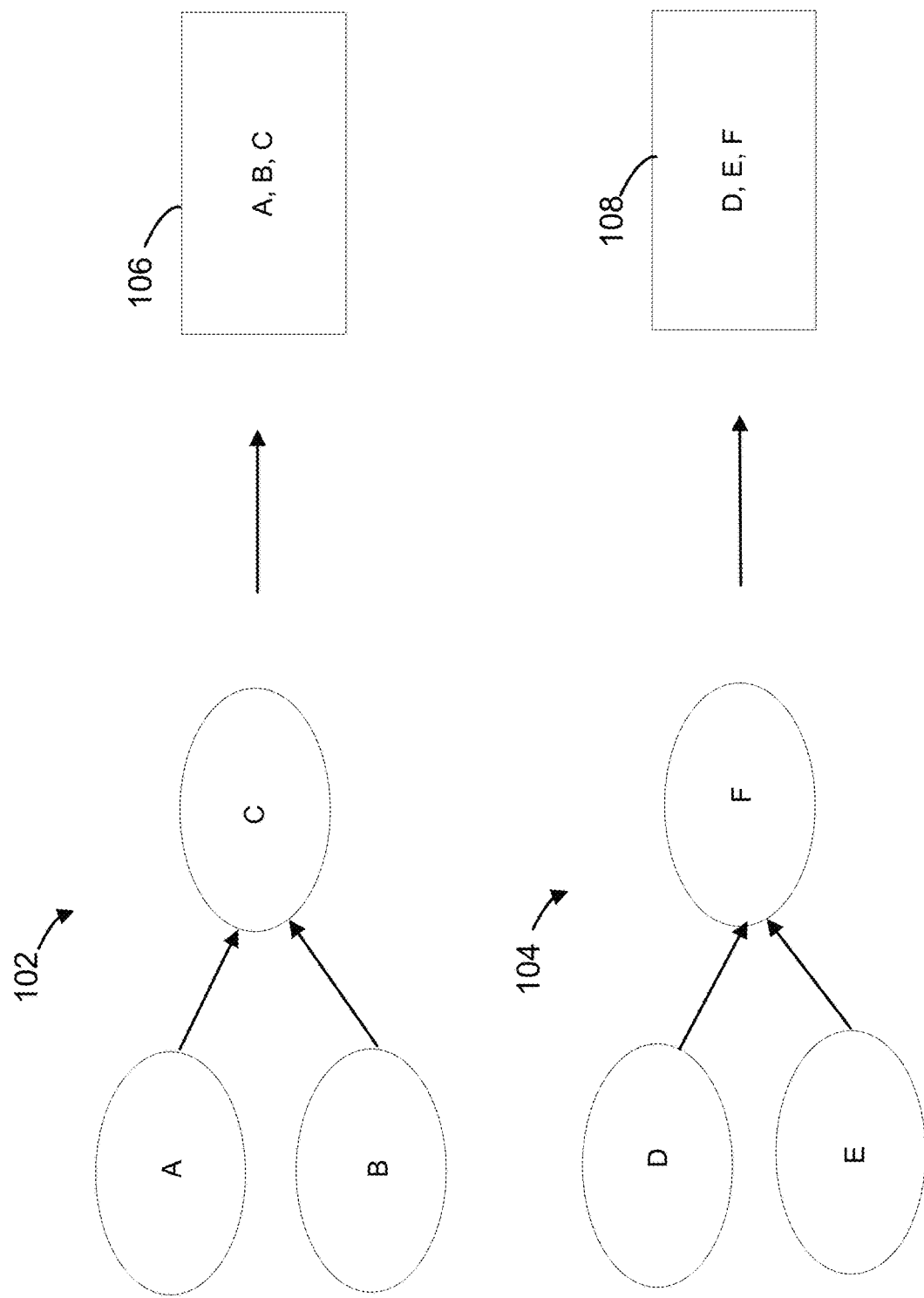
FIG. 1D shows a diagram illustrating clusters of dependent computations and the collapse of the clusters into single node computations, in accordance with some implementations.

In some implementations, the graph may be further reorganized to group clusters of dependencies into single node computations. FIG. 1D shows a diagram illustrating clusters of dependent computations and the collapse of the clusters into single node computations, in accordance with some implementations. In this example, cluster 102 includes nodes A, B, and C, where node C depends on the computations of nodes A and B. Similarly, cluster 104 includes nodes D, E, and F, where node F depends on the computations of nodes D and E. Cluster 102 may be reorganized so that the computations of nodes A, B, and C are performed by a single node, as shown at 106. Similarly, cluster 104 may be reorganized so that computations of nodes D, E, and F are performed a single node, as shown at 108.

Figure 2:
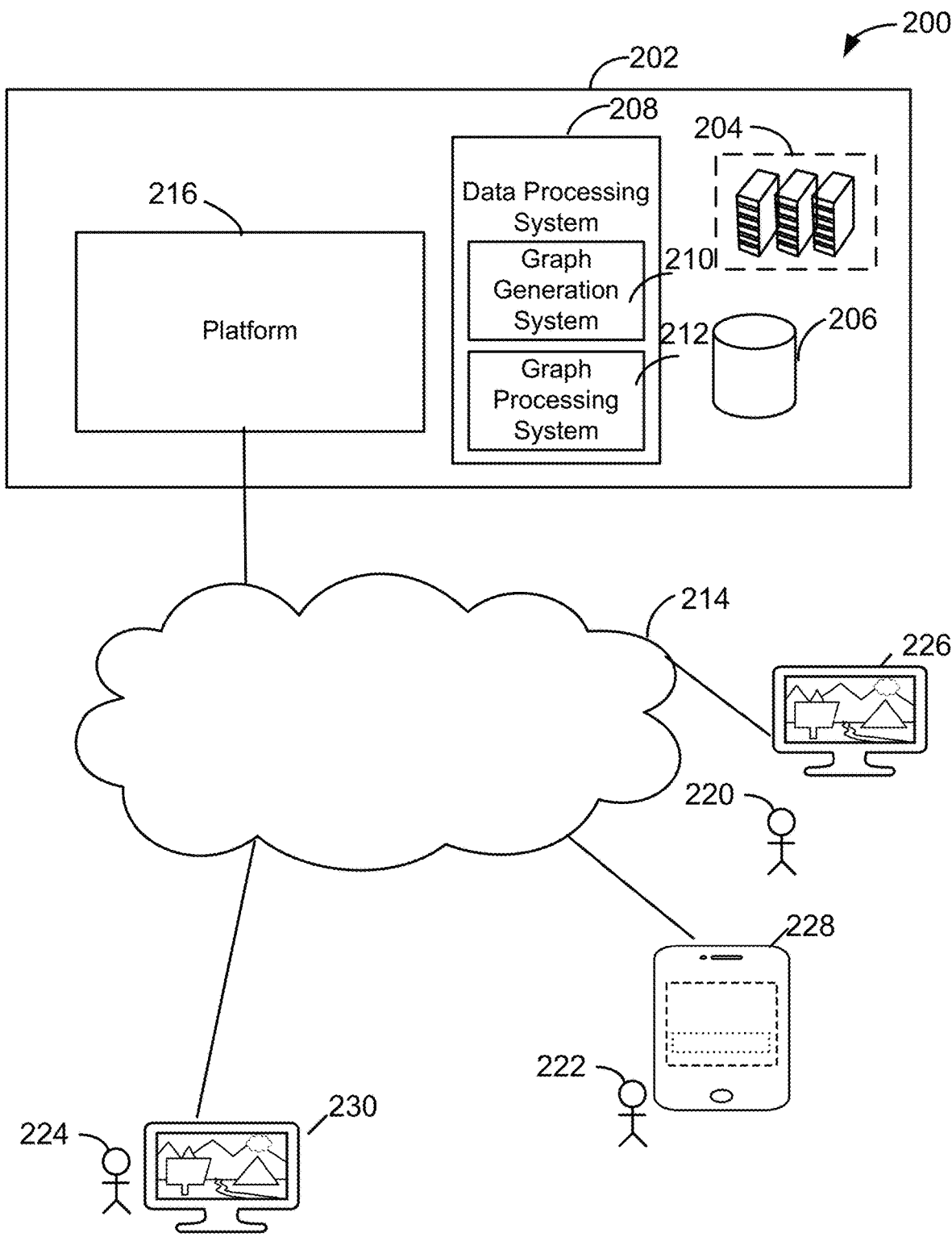
FIG. 2 shows a diagram of an example of a system 200 in which a data processing system is implemented, in accordance with some implementations.

FIG. 2 shows a diagram of an example of a system 200 in which a data processing system is implemented, in accordance with some implementations. Server system 202 includes a variety of different hardware and/or software components that are in communication with each other. In the non-limiting example of FIG. 2, system 202 includes any number of computing devices such as servers 204. Servers 104 are in communication with one or more storage mediums 206 configured to store and maintain relevant data and/or metadata used to perform some of the techniques disclosed herein, as well as to store and maintain relevant data and/or metadata generated by the techniques disclosed herein. Storage mediums 206 may further store computer-readable instructions configured to perform some of the techniques described herein. Storage mediums 106 can also store user profiles and/or database records such as customer relationship management (CRM) records.

System 202 includes data processing system 208. Data processing system 208 can include graph generation system 210, which facilitates the generation of computational graphs. In addition, data processing system 208 can include graph processing system 212. As will be described in further detail below, graph processing system 212 is configured to facilitate the processing of a data stream using a computational graph.

Client devices 226, 228, 230 may be in communication with system 202 via network 214. More particularly, client devices 226, 228, 230 may communicate with servers 204 via network 214. For example, network 214 can be the Internet. In another example, network 214 comprises one or more local area networks (LAN) in communication with one or more wide area networks (WAN) such as the Internet.

Embodiments described herein are often implemented in a cloud computing environment, in which network 214, servers 204, and possible additional apparatus and systems such as multi-tenant databases may all be considered part of the "cloud." Servers 204 may be associated with a network domain, such as www.salesforce.com and may be controlled by a data provider associated with the network domain. In this example, users 220, 222 of client computing devices 226, 228 have accounts at Salesforce.com®. By logging into their accounts, users 226, 228 can access the various services and data provided by system 202. User 224 of client computing device 230 does not have an account at Salesforce.com®. Examples of devices used by users include, but are not limited to a desktop computer or portable electronic device such as a smartphone, a tablet, a laptop, a wearable device such as Google Glass®, another optical head-mounted display (OHMD) device, a smart watch, etc.

In some implementations, users 220, 222, 224 of client devices 226, 228, 230 can access services provided by system 202 via platform 216 or an application installed on client devices 226, 228, 230. Client devices 226, 228 can log into system 202 via an application programming interface (API) or via a graphical user interface (GUI) using credentials of corresponding users 220, 222 respectively.

Client devices 226, 228, 230 can communicate with system 202 to access data or other services, as described herein. A data stream comprising data generated as a result of such communications may be processed using a computational graph, as described herein. In some implementations, a data stream comprises electronic communications such as electronic mail messages generated by client devices 226, 228, 230. A data stream may also include data such as log data or statistics pertaining to such communications. Communications between client devices 226, 228, 230 and system 202 can be initiated by a user 220, 222, 224. Alternatively, communications can be initiated by system 202 and/or application(s) installed on client devices 226, 228, 230.

Figure 3A:
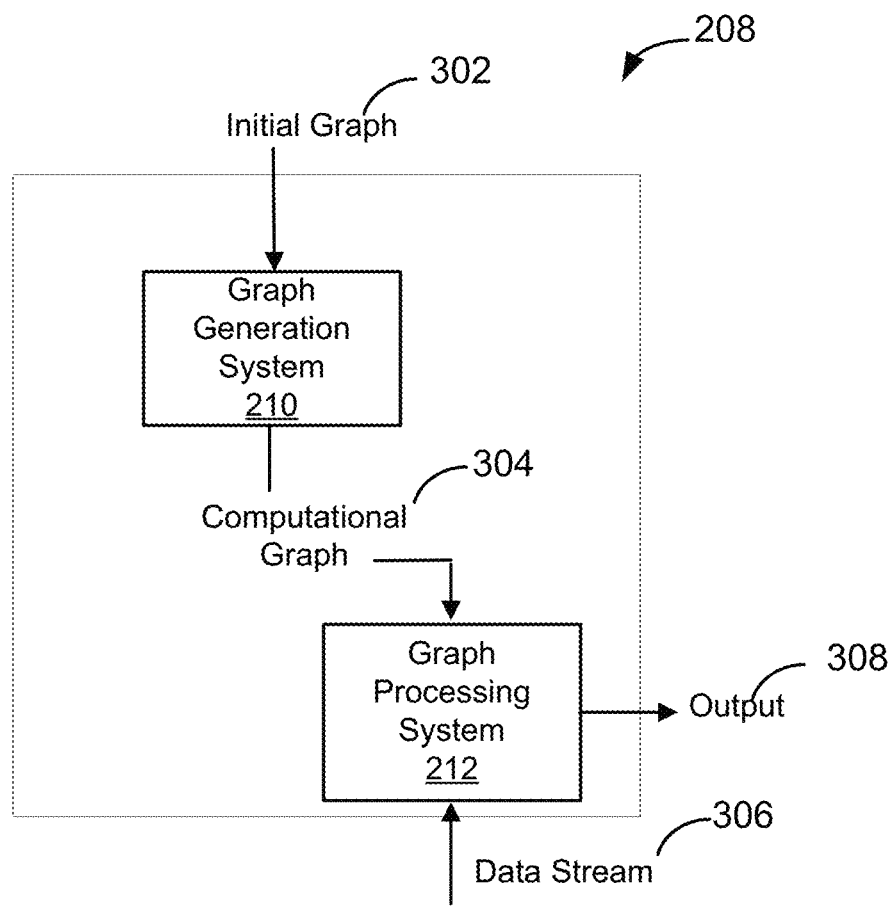
FIG. 3A shows a diagram of an example of a data processing system 208 of FIG. 2, in accordance with some implementations.

FIG. 3A shows a diagram of an example of a data processing system 208 of FIG. 2, in accordance with some implementations. As shown in FIG. 3A, data processing system 208 may include graph generation system 210 and graph processing system 212. An initial computational graph 302 may be processed by graph generation system 210 such that a computational graph 304 is generated. A method of generating a computational graph will be described in further detail below with reference to FIG. 5A. A data stream 306 may be processed by graph processing system 212 using computational graph 304 such that output 308 is produced. A method of processing a data stream using a computational graph will be described in further detail below with reference to FIG. 5B.

Figure 3B:
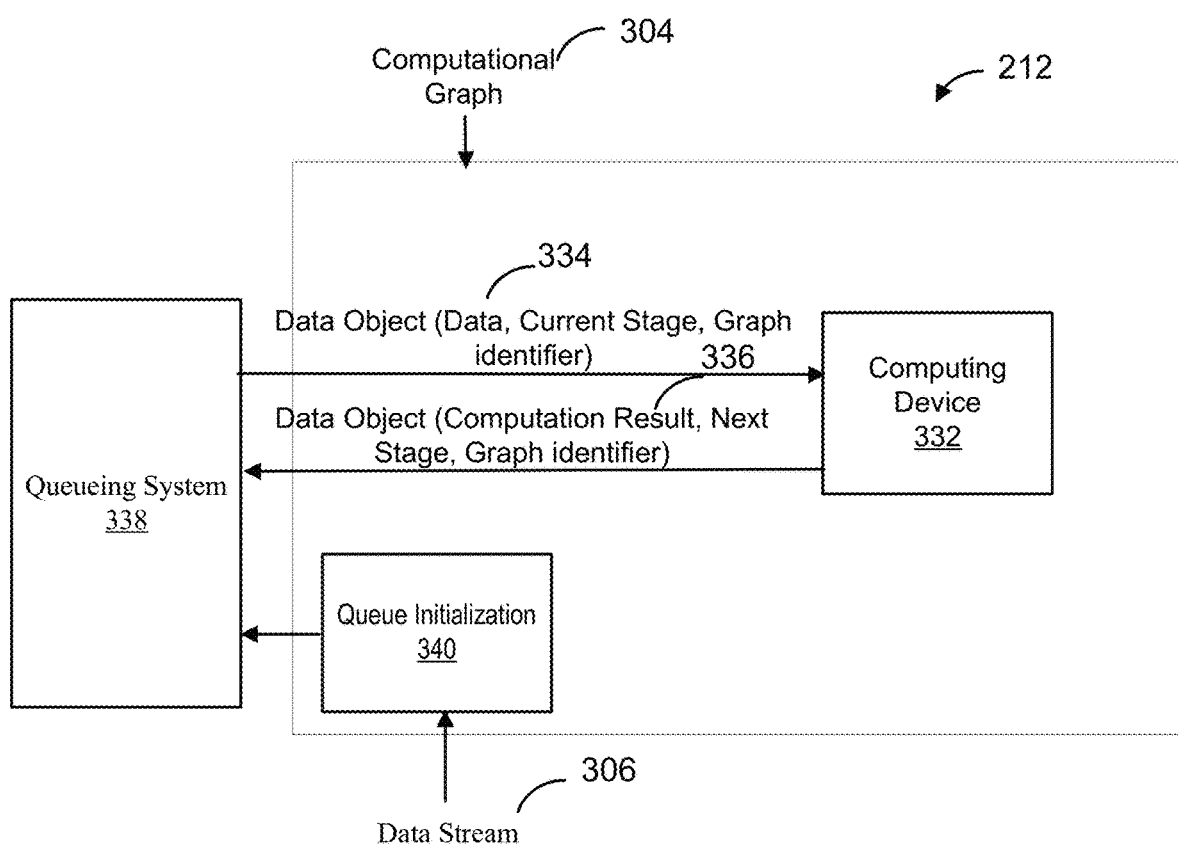
FIG. 3B shows a diagram of an example of a graph processing system 212 of FIG. 3A, in accordance with some implementations.

FIG. 3B shows a diagram of an example of a graph processing system 212 of FIG. 3A, in accordance with some implementations. Graph processing system 212 may include one or more computing devices (e.g., servers) 332. A computing device 332 may receive or otherwise obtain data in conjunction with a stage identifier that identifies a current stage within the computational graph 304. The computing device 332 may use the stage identifier to look up the current stage in the computational graph to identify a computation/operation to be performed on the data.

In some implementations, a computing device 332 receives or otherwise obtains a data object 334 that includes data to be processed and a stage identifier that identifies the current stage in the computational graph. The data may include a payload of a data stream or may represent results generated by a previous stage in the computational graph. In addition, the data object 334 may include a graph identifier of the computational graph 304. The computing device 332 looks up the stage identifier in the computational graph 304 to identify the operation to be performed on the data, performs the operation on the data, and generates a result. The computing device 332 may then provide the result for processing at a subsequent stage. As shown in this example, the computing device 332 may encode a data object 336 with the result, an identifier of the next stage in the computational graph, and, optionally, an identifier of the computational graph.

In some implementations, one or more queues are used to regulate the data that is processed at each stage in the computational graph. For example, the computing device 332 may obtain data object 334 that includes data from a queueing system 338 when the computing device 332 is ready to process data and transmit data object 336 that includes results of processing the data to the queueing system 338 upon completion of the processing. Therefore, computing devices 332 may operate independently without communicating directly with other computing devices 332 of graph processing system 212.

In some implementations, data of the data stream 306 is split among the different paths within the computational graph 304, enabling throughput of the system 212 to be maximized. As will be described in further detail below, queue initialization 340 may encode data values of data stream 306 in data objects with stage identifiers that alternate between all possible stages associated with the initial node of the computational graph, thereby ensuring that data is processed approximately equally along all paths of the computational graph. This also ensures that all possible paths of the computational graph are implemented without overloading one of the paths.

A queueing system may be integrated with data processing system 208 or may be independent from and external to data processing system. In some implementations, each node in the computational graph or its associated stages may be associated with a corresponding queue.

Each queue may include one or more entries, where each entry includes a data object having a data value and a stage identifier. The data value may include a payload of the data stream 306 or a result generated by a previous stage of the computational graph. Thus, each queue entry may include a data value and a stage identifier. In addition, the queue entry and/or data object may identify the pertinent computational graph.

Figure 3C:
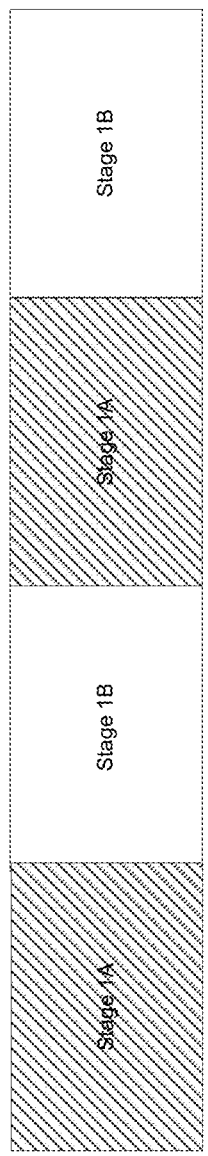
FIG. 3C shows a diagram illustrating a representation of an example queue that may be implemented, in accordance with some implementations.

FIG. 3C shows a diagram illustrating a representation of an example queue that may be implemented, in accordance with some implementations. In this example, the queue is associated with the initial node of the computational graph (e.g., the first node traversed in all of the possible paths) or its associated stages. Referring back to FIG. 1C, the entries and/or corresponding data objects of the queue may be encoded with alternating stage identifiers associated with the possible stages of the initial node of the computational graph 304. For example, the queue entries may be alternately encoded with stages 1A and 1B of the initial node of the computational graph. In this manner, data of the data stream may be split among all paths of the computational graph 304.

In other implementations, each stage is associated with a dedicated queue. Therefore, rather than storing entries that alternate between stages 1A and 1B in a single queue as shown in FIG. 3C, the entries may be added to two separate queues.

Figure 4:
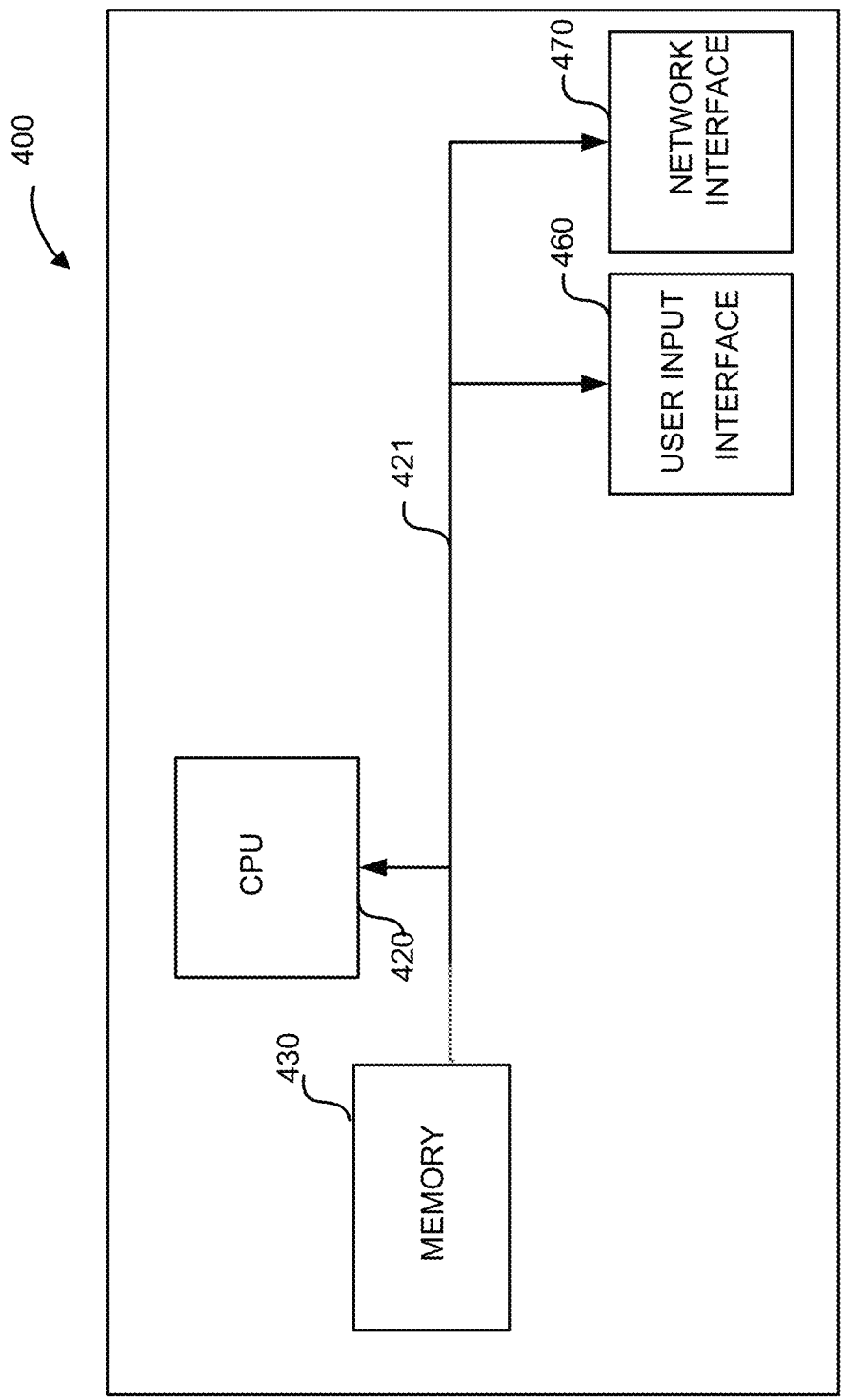
FIG. 4 is a diagram of an example computing system 400 that may be used with some implementations.

A computing device 332 that operates as a server or client device may be implemented via any suitable computing system. FIG. 4 is a diagram of an example computing system 400 that may be used with some implementations. The computing system 400 may include a central processing unit (CPU) 220 having one or more processing cores and a memory 230. In addition, the computing system 400 may include a system bus 421 that couples with various system components including the memory 430 and the CPU 420.

In some implementations, computing system 400 includes a variety of computer program product, which may be configured to execute a graph generation system and/or graph processing system, as described herein. A computer program product can be any available media that can be accessed by computing system 400 including, but not limited to, volatile and nonvolatile media, removable and non-removable media. A computer program product may store information such as computer readable instructions, data structures, or other data such as that described herein.

Memory 430 may include read only memory (ROM)) and/or random-access memory (RAM). In some implementations, memory 430 stores computer readable instructions, data structures, and/or data, which may be generated or processed as described herein.

In some implementations, a user may interact with the computing system 400 through an input device such as a keyboard, a microphone, a remote control, and/or a pointing device such as a mouse, touch pad, or touch screen. These and other input devices may be connected to the CPU 420 through a user input interface 460. Alternatively, an input device may be connected to computing system 400 by another interface such as a universal serial bus (USB) port or wireless interface.

The computing system 400 may operate in a networked environment via which it may connect to a system such as that described above with reference to FIG. 1. The computing system 400 may be connected to a local or wide area network through a network interface or adapter 470.

Figure 5A:
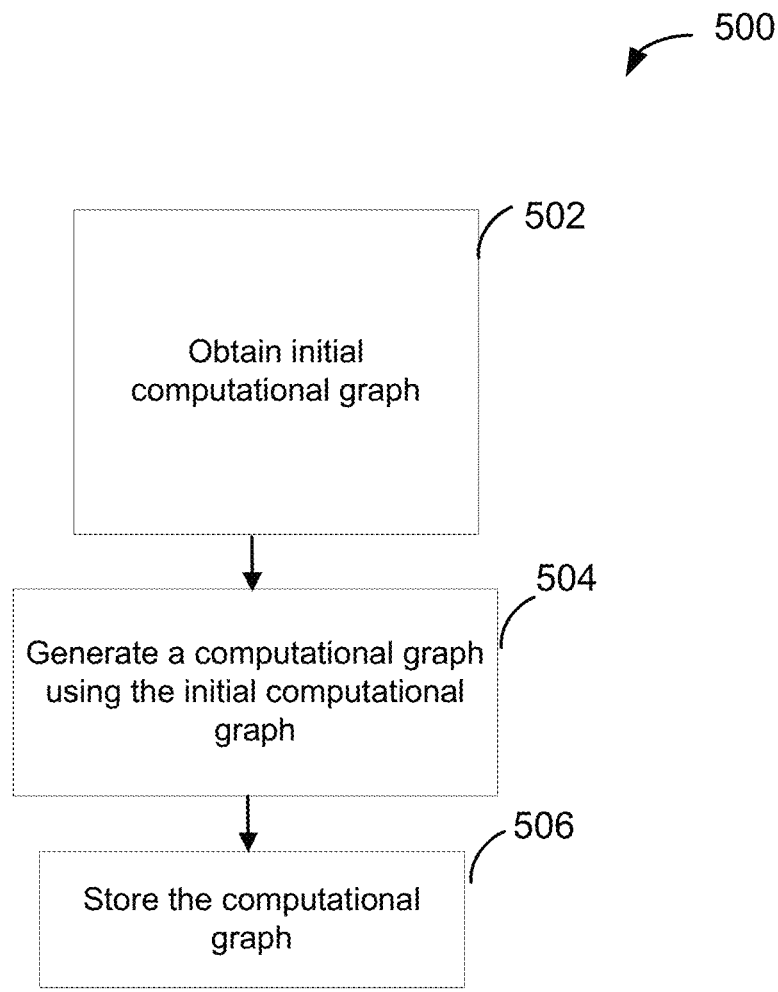
FIG. 5A shows a process flow diagram illustrating an example of a process for generating a computational graph in accordance with some implementations.

FIG. 5A shows a process flow diagram 500 illustrating an example of a process for generating a computational graph in accordance with some implementations. A server system including one or more servers may obtain an initial computational graph at 502. The initial computational graph may include a directed graph. More particularly, the initial computational graph may identify a first plurality of nodes and indicate an order of traversal of directed edges among the first plurality of nodes. One or more of the first plurality of nodes may each correspond to an operation to be performed on data received by the node via one or more of the directed edges connected to the node within the initial computational graph.

The server system generates a computational graph using the initial computational graph at 504. The computational graph represents a second plurality of nodes, where at least one node in the second plurality of nodes is associated with one or more stages of a plurality of stages. For example, each of the second plurality of nodes may be associated with a corresponding set of one or more stages. The second plurality of nodes may be the same as the first plurality of nodes in the initial computational graph. Alternatively, the second plurality of nodes may include fewer or a greater number of nodes than the initial computational graph.

At least one stage of the plurality of stages may be associated with a corresponding operation to be performed on data associated with the stage. For example, each of the plurality of stages may be associated with a corresponding computation or operation. The computational graph may further indicate, for at least one node of the second plurality of nodes, for at least one of the corresponding stages, a next stage.

In some implementations, the computational graph may be generated by applying topological sorting on the initial computational graph. Topological sorting of a directed graph results in a topological, linear ordering of its nodes such that for every directed edge from uv from node u to node v, node u comes before node v in the ordering. Nodes of the directed graph may represent operations to be performed, while edges may represent constraints that one operation be performed before another. In other words, a topological ordering generates one or more valid sequences for the operations or a subset thereof.

Topological sorting may be performed such that each node processes input from a single node. In other words, topological sorting may be performed such that operations are serialized.

A computational graph representing a combination of all valid sequences of the operations in the initial computational graph may be generated. Each valid sequence may identify a sequence of nodes of the initial computational graph. Where a node processed input from more than one input node in the initial computational graph, the node may process input from only one input node in each of the valid sequences. In such instances, the operation that is performed by the node in each of the valid sequences may differ from the operation it would have performed in the initial computational graph. In some implementations, all of the valid sequences start with the same initial node in the computational graph and end with the same final node in the computational graph.

A node's position within a valid sequence of the computational graph may be designated by a corresponding stage identifier. Where a node is present in two or more sequences, the node may be associated with two or more stage identifiers. Therefore, the computational graph may include, for each node, one or more associated stage identifiers.

During the processing of a data stream, a stage identifier identifying a current stage of the computational graph may be used to look up a position within a computational graph. For example, using the stage identifier, it is possible to determine the next stage in the pertinent sequence of the computational graph. The stage identifier may also be used to determine a corresponding operation to be performed at the corresponding stage. For example, the stage identifier may be used to look up the operation in the computational graph or a lookup table that maps stage identifiers to operations.

Once the computational graph has been generated, the server system may then store the computational graph at 506. The computational graph may then be applied to process a data stream, as will be described in further detail below with reference to FIG. 5B.

Figure 5B:
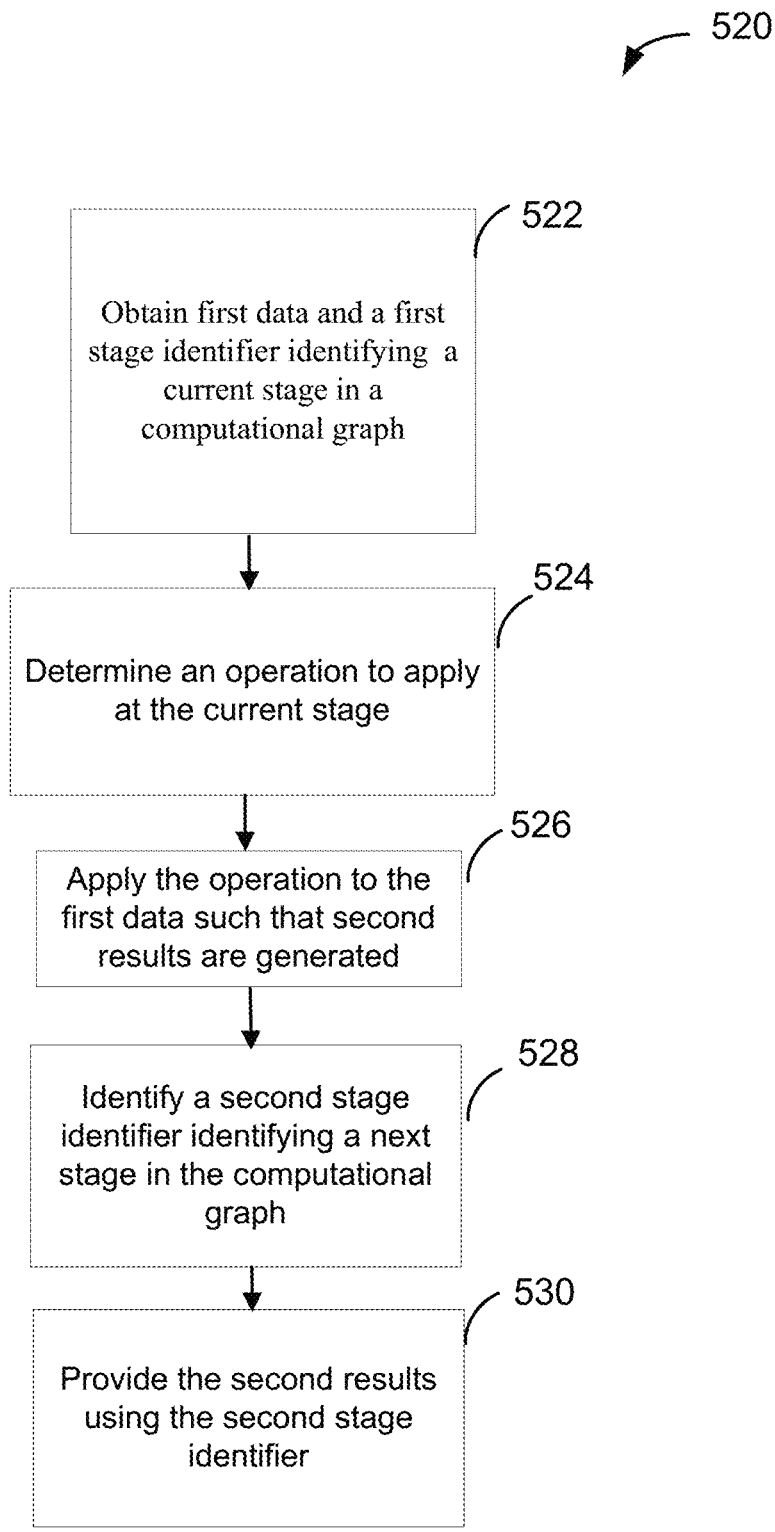
FIG. 5B shows a process flow diagram illustrating an example of a process for processing a data stream using a computational graph, in accordance with some implementations.

FIG. 5B shows a process flow diagram 520 illustrating an example of a process for processing a data stream using a computational graph, in accordance with some implementations. At least one computing device obtains first data and a first stage identifier identifying a current stage (e.g., first stage) in a computational graph at 522. The computing device may obtain the first data and first stage identifier automatically or in response to a request transmitted by the computing device.

In some implementations, the computing device obtains the first data and first stage identifier from another computing device. For example, the computing device may receive the first data and first stage identifier from another computing device that has generated the first data. As another example, the computing device may receive the first data and first stage identifier from a service that manages data including results generated by computing devices, as described herein.

In some implementations, the computing device obtains the first data and first stage identifier from a service such as a queueing service. For example, the computing device may receive a message that includes the first data and first stage identifier from the service. In addition, the message may include an identifier of the computational graph that is to be used to process the first data. For example, the computing device may receive a message that includes a data object that includes the first data and the first stage identifier. The computing device may receive the message responsive to transmitting a request for a data object to the queueing service. For example, the computing device may communicate with the queueing service via an application programming interface (API) of the queueing service.

In some implementations, the request may be a general request. In other words, the request is not directed to a particular queue and does not identify a particular stage of the computational graph. In other implementations, the request identifies a particular queue from which data is requested and/or identifies a particular stage of the computational graph for which data is requested.

In some implementations, the message received by the computing device includes an identifier of the computational graph. For example, the data object may further include the identifier of the computational graph. This enables multiple different computational graphs to be processed within a single computing system. The computing device may access the computational graph by retrieving the computational graph using the pertinent identifier. Computational graphs may be globally accessible by computing devices or may be accessed via a central service.

The computational graph includes a plurality of nodes, where at least one node is associated with a corresponding set of one or more stages of a plurality of stages. In some implementations, each of the plurality of nodes is associated with a corresponding set of stages. At least a subset of the nodes may each have two or more corresponding stages.

At least one stage may be associated with a corresponding operation to be performed on data associated with the stage. For example, each stage of the computational graph may be associated with a corresponding computation or other operation to be performed on data associated with that particular stage.

The computational graph may indicate, for at least a subset of the plurality of nodes, for at least one of the corresponding stages, a next stage. By specifying a next stage in association with a stage of a node, it is possible to direct data along one of the possible paths within the computational graph.

The computing device may parse the message to obtain information such as the first data, the first stage identifier, and/or identifier of the computational graph from field(s) of the message. In some implementations, the computing device may obtain the first data, the first stage identifier, and/or the identifier of the computational graph from a data object transmitted in the message.

The computing device may determine, using the computational graph, an operation to apply at the current stage of the computational graph at 524. For example, the computing device may look up the first stage identifier identifying the current stage in the computational graph or an associated data structure to determine the operation to apply at the current stage. Examples of an operation include, but are not limited to, a mathematical computation, a logical operation such as a comparison operation, and a search operation. An operation may be performed on one or more database records such as CRM records.

The computing device may apply the operation to the first data at 526 such that second results of the operation are generated. For example, the second results can include a numerical result, a character-based result, a set of database records, a set of one or more emails or other communications, a set of user identifiers, etc.

The computing device may identify a second stage identifier identifying a next stage (e.g., second stage) in the computational graph based, at least in part, on the current stage at 528. For example, the computing device may look up the second stage identifier in the computational graph or an associated data structure to identify the next stage in the computational graph.

The computing device may then provide the second results using the second stage identifier at 530. The computing device may communicate the second results and second stage identifier (and optionally the identifier of the computational graph) to another computing device. Such communication may be performed either directly or indirectly, such as via a queueing service. Therefore, the computing device may compose and transmit a message including the second results and second stage identifier to another computing device or a queueing service.

In some implementations, the computing device encapsulates the second results and the second stage identifier (and optionally the identifier of the computational graph) in a second data object. The computing device may transmit the second data object to another computing device that processes the second results using the second stage identifier. Alternatively, the computing device may store the second data object to a queue, as described in further detail below.

The computing device may be configured to communicate with a queueing service. More particularly, the computing device may transmit a message including the second data object to the queueing service. The computing device may transmit the message to a particular queue of the queueing service. For example, the pertinent queue may be identified in the message or second data object transmitted by the computing device to the queueing service. Alternatively, the queueing system may determine the pertinent queue based, at least in part, on the second stage identifier.

In some implementations, each computing device is associated with a corresponding queue managed by the queueing service. In other implementations, each stage of the plurality of stages of the computing graph is associated with a corresponding one of a plurality of queues managed by the queueing service. More particularly, each queue may be mapped to one or more stage identifiers.

The computing device may perform a lookup of the second stage identifier in a lookup table that maps each of a plurality of stage identifiers to a corresponding one of a plurality of queues of the queueing service. In this manner, the computing device may ascertain the pertinent queue of the queueing service. The computing device may insert an identifier of the pertinent queue of the queueing service into a field of the message and transmit the message to the queueing service. Alternatively, the computing device may encapsulate the message with a header that identifies the pertinent queue of the queueing service. The computing device may then transmit the encapsulated message to the queueing service for storage. The queueing service may process the encapsulated message to obtain the queue identifier and store the message in the pertinent queue.

The queueing service may process queues of the queueing service using a first in first out (FIFO) algorithm. More particularly, the queueing service may add a data object it receives to the end of the pertinent queue. Similarly, the queueing service may provide data objects to computing devices from the front of the pertinent queue. The queueing service may determine the pertinent queue from a queue identifier or stage identifier provided in a message received from a computing device, as described herein.

By implementing stages that correspond to operations to be performed on data, it is possible to separate the operations from computing devices that will process the data. As a result, any computing device may process data at any stage of the computational graph. Furthermore, a single computing node may process data at multiple stages of the computational graph. Therefore, a data stream may be processed according to a computational graph using any number of computing devices.

In some implementations, dependent computations may be clustered such that two or more dependent computations are performed by a single computing device. A dependent computation may be designated by a corresponding indicator within the computational graph (e.g., in association with a stage of the computational graph) and/or in information transmitted to a computing node. For example, a dependent computation may be designated in a data object received by the computing device. Thus, a computing node may interpret such an indicator as instructions to execute an operation corresponding to a next stage in the computational graph locally rather than provide its results to a queueing service.

In other implementations, a computing device may elect to further process the second results it has generated using the second stage identifier. In other words, the computing device may elect to process the second results of an operation locally at a next (e.g., second) stage in a computational graph without receiving instructions to do so. For example, in some implementations, computing devices may be configured to perform specific operations, which may be associated with stages of the computational graph. If a computing device determines that it is capable of performing a second operation associated with a next (e.g., second) stage in the computational graph, the computing device may opt to perform the operation locally.

In some implementations, a computing device may perform a sequence of two or more "dependent" operations. The message may include data and other information corresponding to the dependent operations to be performed. For example, the message may include two or more data objects. Alternatively, the computing device may sequentially process data received in two or more messages, as will be described in further detail below.

Figure 5C:
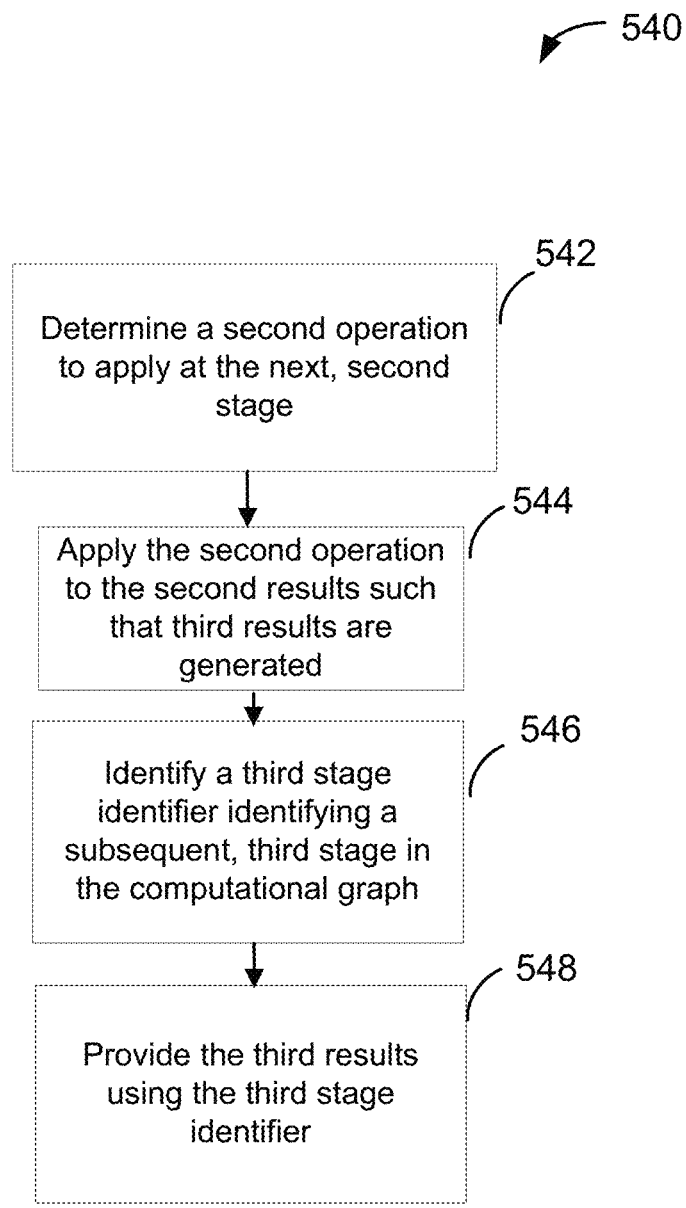
FIG. 5C shows a process flow diagram illustrating an example of a process for operating a computing device as multiple vertices, in accordance with some implementations.

FIG. 5C shows a process flow diagram 540 illustrating an example of a process for operating a computing device as multiple vertices, in accordance with some implementations. Rather than providing the second results using the second stage identifier to another device or system at 530, the computing device may proceed with further processing the second results locally. More particularly, the computing device may determine a second operation to apply at the next (e.g., second) stage of the computational graph at 542. If the computing device determines that is not capable of performing the second operation, the computing device may provide the second results using the second stage identifier to another device as described above at 530. Alternatively, the computing device may determine that it is capable of performing the second operation. At 544, the computing device may apply the second operation to the second results such that third results are generated. The computing device may identify a third stage identifier identifying a subsequent (e.g., third) stage of the computational graph at 546. For example, the computing device may perform a lookup in the computational graph using the second stage identifier to identify the third stage identifier of the subsequent stage in the computational graph. The computing device may then provide the third results using the third stage identifier at 548. More particularly, the computing device may provide the third results using the third stage identifier to another device or system, as described herein. Alternatively, the computing device may process the third results locally. Therefore, a single computing device may perform two or more sequential operations of a path of a computational graph.

Figure 5D:
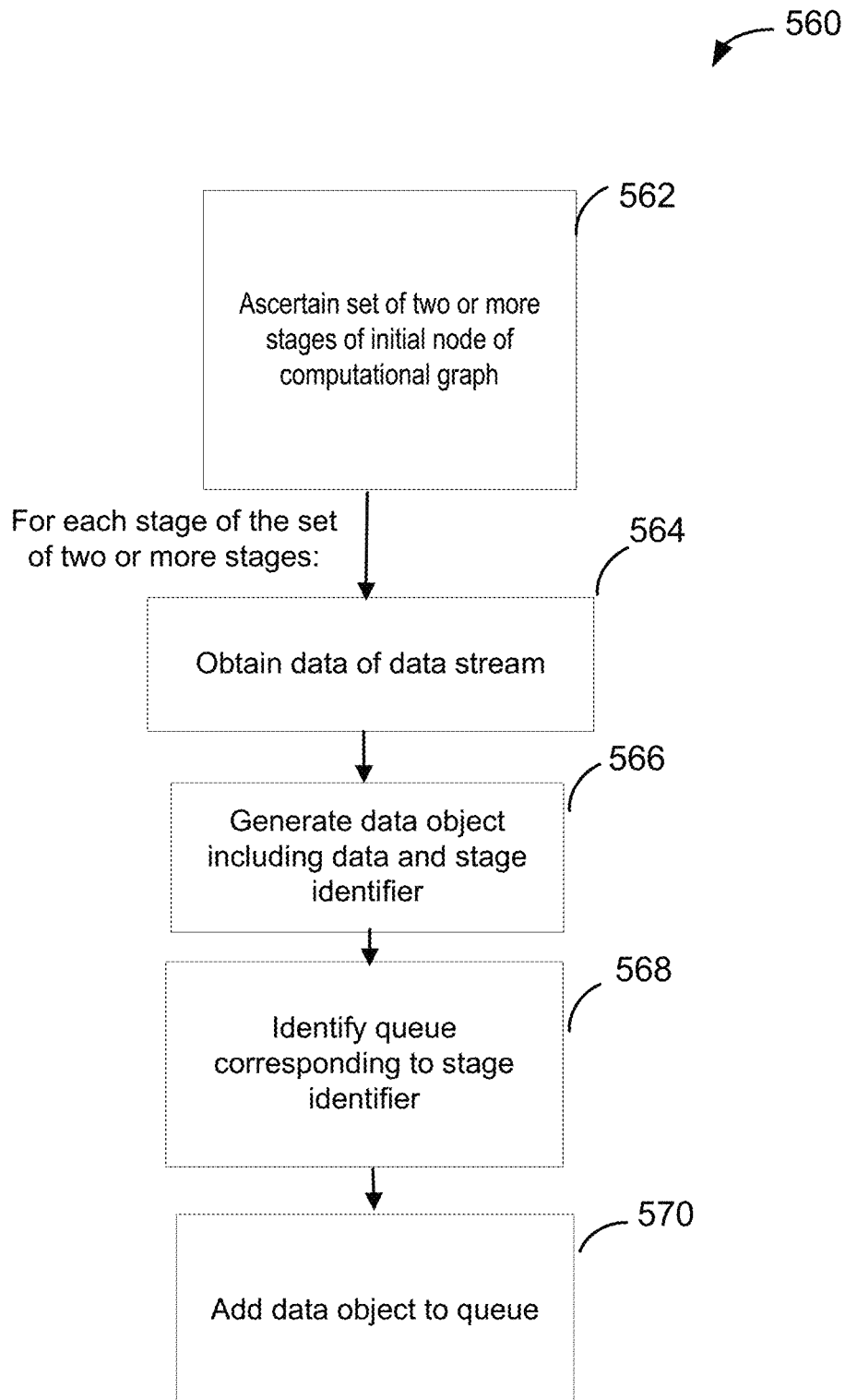
FIG. 5D shows a process flow diagram illustrating an example of a process for initializing a set of queues of a queueing service, in accordance with some implementations.

Throughput may be maximized by ensuring that data is processed along all possible paths of a computational graph. This may be accomplished, in part, through a queue initialization process. FIG. 5D shows a process flow diagram 560 illustrating an example of a process for initializing a set of queues of a queueing service, in accordance with some implementations. An initialization process ascertains a set of two or more stages of an initial node of a computational graph at 562. For example, the initial node may be the first node traversed in all possible paths of the computational graph. For each stage of the set of two or more stages, a data object is generated and stored in a queue of a queueing system, which may be managed by an independent queuing service, as described herein. More particularly, data of a data stream may be obtained at 564. For example, the data may include the next payload of the data stream. A data object may be generated at 566 such that the data object includes the data and a stage identifier of the stage. A queue corresponding to the stage identifier may be identified at 568. For example, a queue identifier associated with the queue may be ascertained via a lookup in a mapping table that maps queues to stage identifiers. The data object may then be added to the queue at 570. The process may repeat at 564 as further data of the data stream is received.

In some implementations, a set of two or more stages associated with a node such as the initial node of the computational graph are associated with a single queue. The queue may include a plurality of entries, where each of the entries includes a data object. By alternating between all possible stages of the initial node during the queue initialization process, it is possible to ensure that the entries of the queue include stage identifiers that alternate between the possible stages of the initial node of the computational graph. In other words, data objects corresponding to the possible stages will be interleaved within the queue. In this manner, data of a data stream may be distributed equally among all possible paths of the computational graph.

It is important note that while the above-referenced implementations are described with reference to computational graphs, each computational graph may be represented using a variety of data structures. For example, a computational graph may be represented using one or more arrays, linked lists, or tree data structures. Therefore, a computational graph need not be represented using a conventional graph representation.

Some but not all of the techniques described or referenced herein are implemented using or in conjunction with a database system. Salesforce.com, inc. is a provider of customer relationship management (CRM) services and other database management services, which can be accessed and used in conjunction with the techniques disclosed herein in some implementations. In some but not all implementations, services can be provided in a cloud computing environment, for example, in the context of a multi-tenant database system. Thus, some of the disclosed techniques can be implemented without having to install software locally, that is, on computing devices of users interacting with services available through the cloud. Some of the disclosed techniques can be implemented via an application installed on computing devices of users.

Information stored in a database record can include various types of data including character-based data, audio data, image data, animated images, and/or video data. A database record can store one or more files, which can include text, presentations, documents, multimedia files, and the like. Data retrieved from a database can be presented via a computing device. For example, visual data can be displayed in a graphical user interface (GUI) on a display device such as the display of the computing device. In some but not all implementations, the disclosed methods, apparatus, systems, and computer program products may be configured or designed for use in a multi-tenant database environment.

The term "multi-tenant database system" generally refers to those systems in which various elements of hardware and/or software of a database system may be shared by one or more customers. For example, a given application server may simultaneously process requests for a great number of customers, and a given database table may store rows of data such as feed items for a potentially much greater number of customers.

An example of a "user profile" or "user's profile" is a database object or set of objects configured to store and maintain data about a given user of a social networking system and/or database system. The data can include general information, such as name, title, phone number, a photo, a biographical summary, and a status, e.g., text describing what the user is currently doing. Where there are multiple tenants, a user is typically associated with a particular tenant. For example, a user could be a salesperson of a company, which is a tenant of the database system that provides a database service.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

Some non-limiting examples of systems, apparatus, and methods are described below for implementing database systems and enterprise level social networking systems in conjunction with the disclosed techniques. Such implementations can provide more efficient use of a database system. For instance, a user of a database system may not easily know when important information in the database has changed, e.g., about a project or client. Such implementations can provide feed tracked updates about such changes and other events, thereby keeping users informed.

Figure 6A:
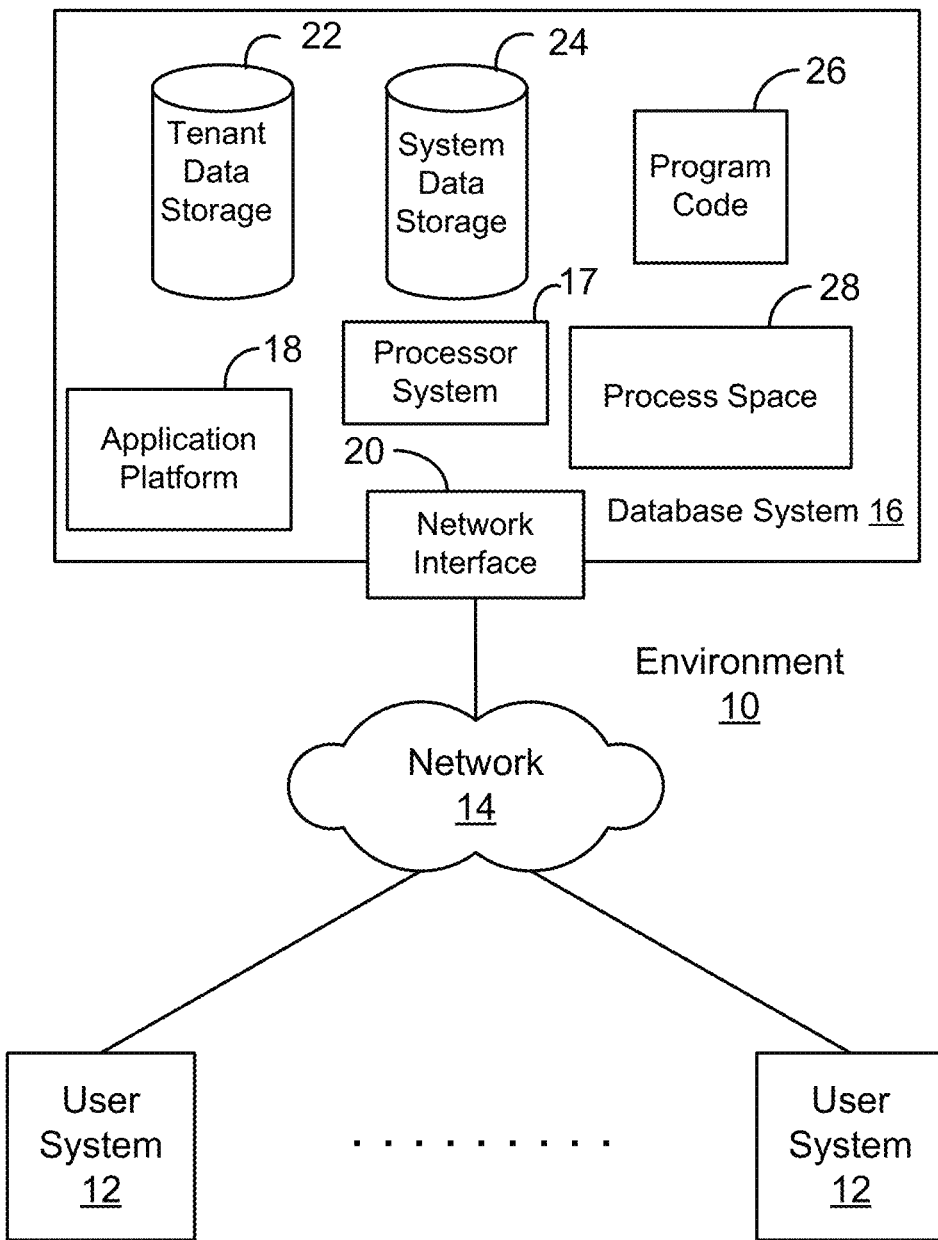
FIG. 6A shows a block diagram of an example of an environment 10 in which an on-demand database service can be used in accordance with some implementations.

FIG. 6A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 6A (and in more detail in FIG. 6B) user systems 12 might interact via a network 14 with an on-demand database service, which is implemented in the example of FIG. 6A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software. e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 6A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 7A:
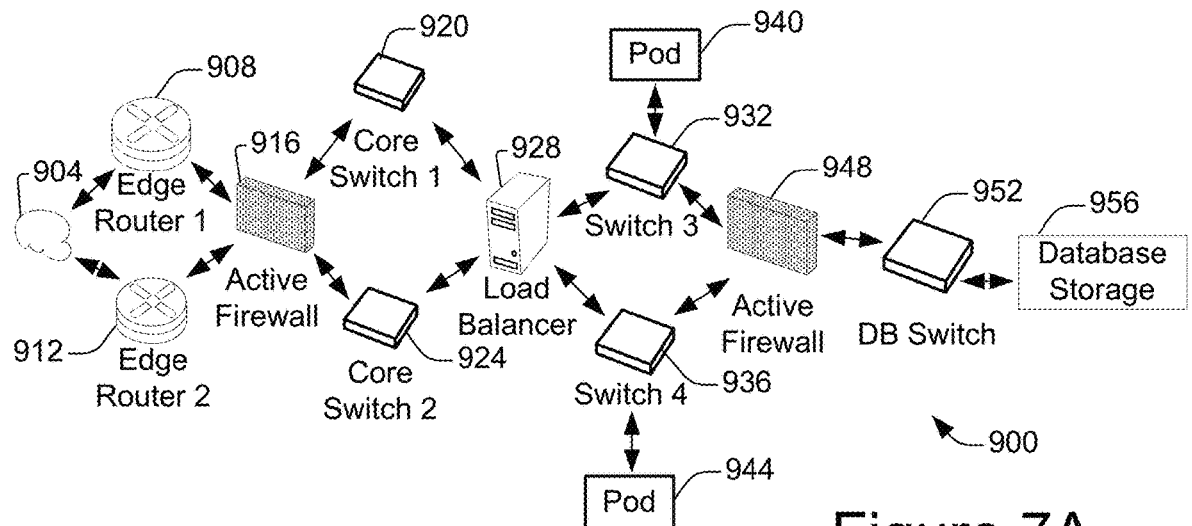
FIG. 7A shows a system diagram of an example of architectural components of an on-demand database service environment 900, in accordance with some implementations.
Figure 7B:
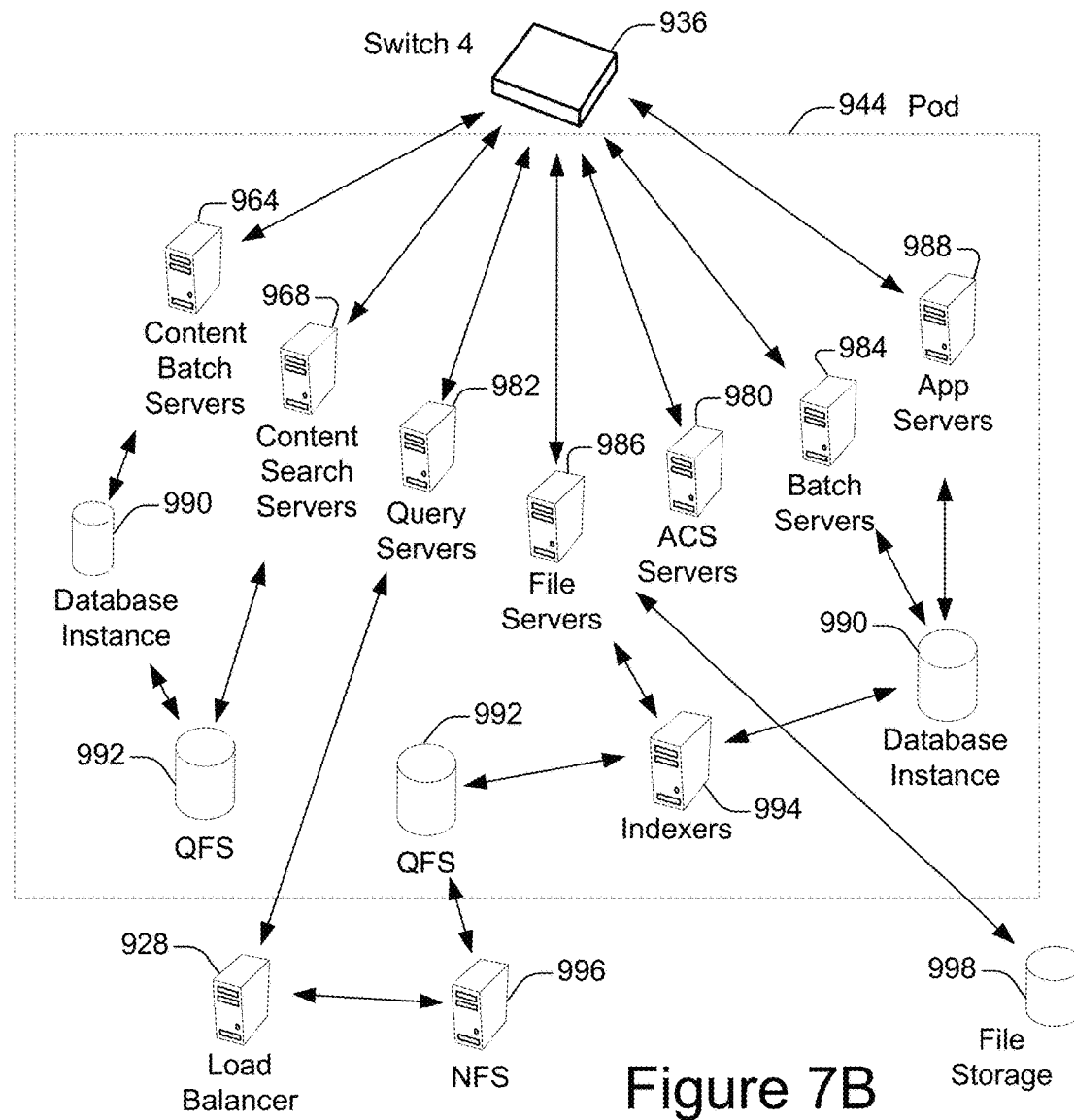
FIG. 7B shows a system diagram further illustrating an example of architectural components of an on-demand database service environment, in accordance with some implementations.

One arrangement for elements of system 16 is shown in FIGS. 7A and 7B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 6A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser. Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium®, processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

Figure 6B:
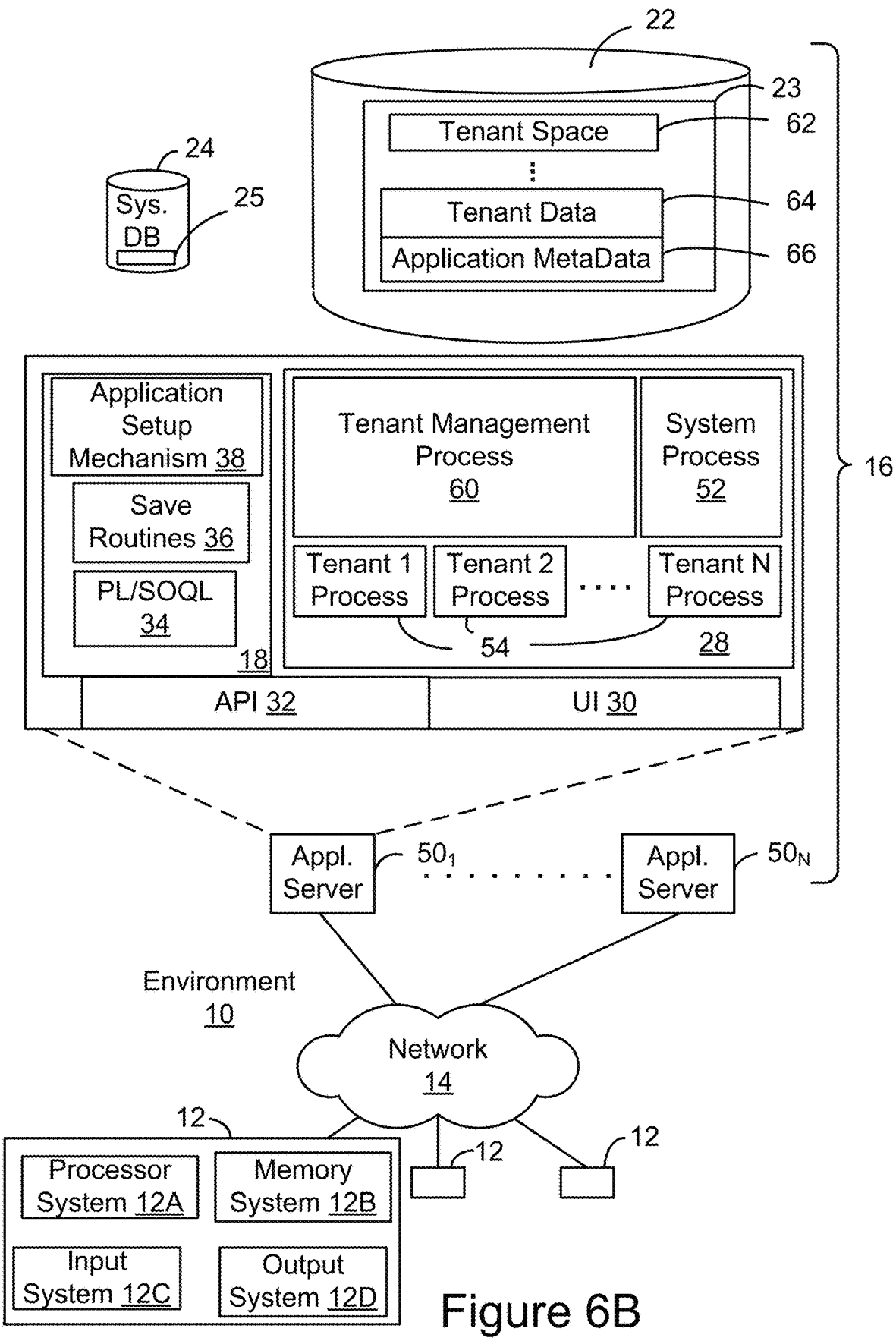
FIG. 6B shows a block diagram of an example of some implementations of elements of FIG. 6A and various possible interconnections between these elements.

FIG. 6B shows a block diagram of an example of some implementations of elements of FIG. 6A and various possible interconnections between these elements. That is, FIG. 6B also illustrates environment 10. However, in FIG. 6B elements of system 16 and various interconnections in some implementations are further illustrated. FIG. 6B shows that user system 12 may include processor system 12A, memory system 12B, input system 12C, and output system 12D. FIG. 6B shows network 14 and system 16. FIG. 6B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 6A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 6B, system 16 may include a network interface 20 (of FIG. 6A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server 50, might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MIS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

FIG. 7A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

As shown in FIGS. 7A and 7B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 7A and 7B, some implementations of an on-demand database service environment may include anywhere from one to many devices of each type. Also, the on-demand database service environment need not include each device shown in FIGS. 7A and 7B, or may include additional devices not shown in FIGS. 7A and 7B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 7B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 7A and 7B.

FIG. 7B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, Calif. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

In some implementations, one or more application servers or other servers described above with reference to FIGS. 7A and 7B include a hardware and/or software framework configurable to execute procedures using programs, routines, scripts, etc. Thus, in some implementations, one or more of application servers $50_1$-$50_N$ of FIG. 7B can be configured to initiate performance of one or more of the operations described above by instructing another computing device to perform an operation. In some implementations, one or more application servers $50_1$-$50_N$ carry out, either partially or entirely, one or more of the disclosed operations. In some implementations, app servers 988 of FIG. 7B support the construction of applications provided by the on-demand database service environment 900 via the pod 944. Thus, an app server 988 may include a hardware and/or software framework configurable to execute procedures to partially or entirely carry out or instruct another computing device to carry out one or more operations disclosed herein. In alternative implementations, two or more app servers 988 may cooperate to perform or cause performance of such operations. Any of the databases and other storage facilities described above with reference to FIGS. 6A, 6B, 7A and 7B can be configured to store lists, articles, documents, records, files, and other objects for implementing the operations described above. For instance, lists of available communication channels associated with share actions for sharing a type of data item can be maintained in tenant data storage 22 and/or system data storage 24 of FIGS. 7A and 7B. By the same token, lists of default or designated channels for particular share actions can be maintained in storage 22 and/or storage 24. In some other implementations, rather than storing one or more lists, articles, documents, records, and/or files, the databases and other storage facilities described above can store pointers to the lists, articles, documents, records, and/or files, which may instead be stored in other repositories external to the systems and environments described above with reference to FIGS. 6A, 6B, 7A and 7B.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media: and hardware devices specially configured to store program instructions, such as read-only memory (ROM) devices and random access memory (RAM) devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

The invention claimed is:

1. A method, comprising:
obtaining, by one or more servers, a first computational graph, the first computational graph identifying a first plurality of nodes and indicating an order of traversal of directed edges among the first plurality of nodes, one or more of the first plurality of nodes corresponding to an operation to be performed on data received by the node via one or more of the directed edges connected to the node within the first computational graph;
generating, by the servers, a second computational graph using the order of traversal from the first computational graph, the second computational graph representing a second plurality of nodes, wherein the second computational graph includes a first path of traversal among the second plurality of nodes and a second path of traversal among the second plurality of nodes;
generating, by the servers, a plurality of stage identifiers, wherein a stage identifier corresponds to both a node in the second plurality of nodes and one of the first path or the second path, and wherein an operation to be performed on data is dependent on the stage identifier;
storing, by the servers, the second computational graph;
identifying, by the servers for a first node of the second computational graph, a corresponding set of two or more stages;
for each stage of the set of two of more stages,
obtaining a payload of a data stream; and
storing data of the payload and a respective stage identifier of the stage in a queue entry of a queue, wherein storing data of the payload and a respective stage identifier of the stage in a queue entry of a queue includes storing an object including the payload and respective stage identifier in the queue;
providing the object from the queue to a node;
performing, by the node, a lookup operation to identify an operation associated with a first stage identifier from the object;
generating, by the node, results of the operation by applying the operation to first data from the object;
identifying, by the node, a second stage identifier identifying, for the current stage, a next stage in the computational graph; and
generating and providing, by the node, a second data object including both the results of the operation and the second stage identifier.

2. The method as recited in claim 1, wherein a node of the second plurality of nodes is associated with the first path and the second path.

3. The method as recited in claim 1, further comprising:
facilitating, by the servers, applying the second computational graph to a data stream such that an output result is generated.

4. The method as recited in claim 1, wherein a first stage in the set of two or more stages is associated with the first path and a second stage in the set of two or more stages is associated with the second path.

5. The method as recited in claim 1, wherein the queue entry further comprises a respective stage identifier from the plurality of stage identifiers.

6. The method as recited in claim 1, further comprising:
storing an identifier of the second computational graph in the queue entry.

7. The system as recited in claim 6, the server system further configurable to cause:
providing the payload, stage identifier, and identifier of the second computational graph from the queue to a node.

8. A system comprising:
a server system including one or more servers, the server system including a processor coupled to a memory, the server system configurable to cause:
obtaining a first computational graph, the first computational graph identifying a first plurality of nodes and indicating an order of traversal of directed edges among the first plurality of nodes, and wherein one or more of the first plurality of nodes corresponding to an operation to be performed on data received by the node via one or more of the directed edges connected to the node within the first computational graph;

generating a second computational graph using the order of traversal from the first computational graph, the second computational graph representing a second plurality of nodes, wherein the second computational graph includes a first path of traversal among the second plurality of nodes and a second path of traversal among the second plurality of nodes;

generating a plurality of stage identifiers, wherein a stage identifier corresponds to both a node in the second plurality of nodes and one of the first path or the second path, and wherein an operation to be performed on data is dependent on the stage identifier;

storing the second computational graph;

identifying, for a first node of the second computational graph, a corresponding set of two or more stages;

for each stage of the set of two of more stages,
  obtaining a payload of a data stream; and
  storing data of the payload and a respective stage identifier of the stage in a queue entry of a queue, wherein storing data of the payload and a respective stage identifier of the stage in a queue entry of a queue includes storing an object including the payload and respective stage identifier in the queue;
  providing the object from the queue to a node;
  performing, by the node, a lookup operation to identify an operation associated with a first stage identifier from the object;
  generating, by the node, results of the operation by applying the operation to first data from the object;
  identifying, by the node, a second stage identifier identifying, for the current stage, a next stage in the computational graph; and
  generating and providing, by the node, a second data object including both the results of the operation and the second stage identifier.

9. The system as recited in claim 8, wherein a node of the second plurality of nodes is associated with the first path and the second path.

10. The system as recited in claim 8, the server system further configurable to cause:
  applying the second computational graph to a data stream such that an output result is generated.

11. The system as recited in claim 8, wherein a first stage in the set of two or more stages is associated with the first path and a second stage in the set of two or more stages is associated with the second path.

12. The system as recited in claim 8, wherein the queue entry further comprises a respective stage identifier from the plurality of stage identifiers.

13. A computer program product comprising computer-readable program code capable of being executed by one or more processors when retrieved from a non-transitory computer-readable medium, the program code comprising computer-readable instructions configurable to cause:
  obtaining a first computational graph, the first computational graph identifying a first plurality of nodes and indicating an order of traversal of directed edges among the first plurality of nodes, and wherein one or more of the first plurality of nodes corresponding to an operation to be performed on data received by the node via one or more of the directed edges connected to the node within the first computational graph;
  generating a second computational graph using the order of traversal from the first computational graph, the second computational graph representing a second plurality of nodes, wherein the second computational graph includes a first path of traversal among the second plurality of nodes and a second path of traversal among the second plurality of nodes;
  generating a plurality of stage identifiers, wherein a stage identifier corresponds to both a node in the second plurality of nodes and one of the first path or the second path, wherein an operation to be performed on data is dependent on the stage identifier;
  storing the second computational graph;
  identifying, for a first node of the second computational graph, a corresponding set of two or more stages; and
  for each stage of the set of two of more stages,
    obtaining a payload of a data stream; and
    storing data of the payload and a respective stage identifier of the stage in a queue entry of a queue, wherein storing data of the payload and a respective stage identifier of the stage in a queue entry of a queue includes storing an object including the payload and respective stage identifier in the queue;
    providing the object from the queue to a node;
    performing, by the node, a lookup operation to identify an operation associated with a first stage identifier from the object;
    generating, by the node, results of the operation by applying the operation to first data from the object;
    identifying, by the node, a second stage identifier identifying, for the current stage, a next stage in the computational graph; and
    generating and providing, by the node, a second data object including both the results of the operation and the second stage identifier.

14. The computer program product as recited in claim 13, wherein a node of the second plurality of nodes is associated with the first path and the second path.

15. The computer program product as recited in claim 13, wherein a first stage in the set of two or more stages is associated with the first path and a second stage in the set of two or more stages is associated with the second path.

16. The computer program product as recited in claim 13, the program code comprising computer-readable instructions further configurable to cause:
  providing the payload and stage identifier from the queue to a node.

* * * * *